United States Patent [19]

Narushima et al.

[11] Patent Number: 4,986,704
[45] Date of Patent: Jan. 22, 1991

[54] TOOL MOUNTING APPARATUS

[75] Inventors: Hiroshi Narushima, Konan; Sumio Kawai, Kasugai, both of Japan

[73] Assignee: Okuma Mahinery Works Ltd., Kitaku, Japan

[21] Appl. No.: 275,223

[22] Filed: Nov. 22, 1988

[30] Foreign Application Priority Data

Nov. 24, 1987 [JP] Japan .................................. 62-295490

[51] Int. Cl.⁵ .......................... B23C 5/26; B23B 31/10
[52] U.S. Cl. ..................................... 409/233; 51/168; 267/64.13; 408/239 R
[58] Field of Search .................. 51/168; 409/233, 239, 409/239.1, 240, 904, 232, 234; 267/64.11, 64.13; 188/312, 268; 408/239 A, 240; 279/4

[56] References Cited

U.S. PATENT DOCUMENTS

| | | | |
|---|---|---|---|
| 2,683,040 | 7/1954 | Graham | 279/4 |
| 3,118,345 | 1/1964 | Bullard, III et al. | 409/233 |
| 4,532,856 | 8/1985 | Taylor | 267/64.13 |
| 4,641,415 | 2/1987 | Charra | 51/168 |
| 4,705,440 | 11/1987 | Babel | 409/233 |
| 4,746,252 | 5/1988 | Jesinger | 409/233 |

FOREIGN PATENT DOCUMENTS 3541236 5/1987 Fed. Rep. of Germany .

*Primary Examiner*—Roscoe V. Parker
*Attorney, Agent, or Firm*—Darby & Darby

[57] ABSTRACT

A tool mounting apparatus for fixedly mounting a tool, an abrasive wheel and the like to a spindle of a machine such as a machine tool, by making use of a resilient means incorporated into the spindle. The resilient means is constituted to create a resilient force by compressing a sealingly enclosed high elastic fluid.

4 Claims, 2 Drawing Sheets

TOOL MOUNTING APPARATUS

BACKGROUND OF THE INVENTION

The present invention relates to an apparatus for mounting a tool to a spindle of a machine such as a machine tool and the like, which is incorporated into the spindle or rotary shaft of the machine.

Generally, in a tool mounting apparatus incorporated into a spindle of a machine tool such as a machining center, a tool is mounted to the spindle in such a manner that a tool holder with the tool is inserted into the spindle, and then a pull stud of the tool holder is gripped by closing a collect attachment (which is arranged in the spindle and can be opened and closed in response to an axial movement of a pull rod) by shifting the pull rod axially by making use of resilient force of coned disc springs or a coil spring, thus fixedly attaching the tool holder with the tool to the spindle.

In the conventional tool mounting apparatus, since the coned disc springs or the coil spring were/was used to pull the pull rod for closing the collet attachment and since the inner diameter of such springs is decreased and, the other diameter of the springs is increased when the springs are compressed, it was necessary to maintain clearances between the spring and a case for accommodating the spring, and between the spring and a spring guide rod. Accordingly, during the continuous rotation of the spindle the spring might be deviated from its centered position by a distance corresponding to such clearance, which deviation or eccentricity of the spring might cause the vibration of the spindle and/or the tool being rotated, due to unbalance rotation thereof. Further, the spring itself had a limitation with respect to balance of mass during rotation thereof. Therefore, in the conventional tool mounting apparatus, there was a problem that the spindle could not be rotated effectively at a high speed due to the vibration.

SUMMARY OF THE INVENTION

An object of the present invention is to provide a tool mounting apparatus incorporated into a spindle to which the tool is mounted, which can eliminate the drawbacks of the conventional tool mounting apparatus and which permits the spindle to be rotated effectively at a high speed.

According to the present invention, there is provided a tool mounting apparatus for mounting a tool, grinding wheel and the like to a spindle or a rotary shaft of a machine by making use of resilient means incorporated into the spindle and the like, wherein the resilient means create a resilient force by compressing a sealingly enclosed high elastic fluid.

DETAILED DESCRIPTION OF THE PREFERRED EMBODIMENTS

The present invention will now be explained with reference to the drawings.

Figure 2:
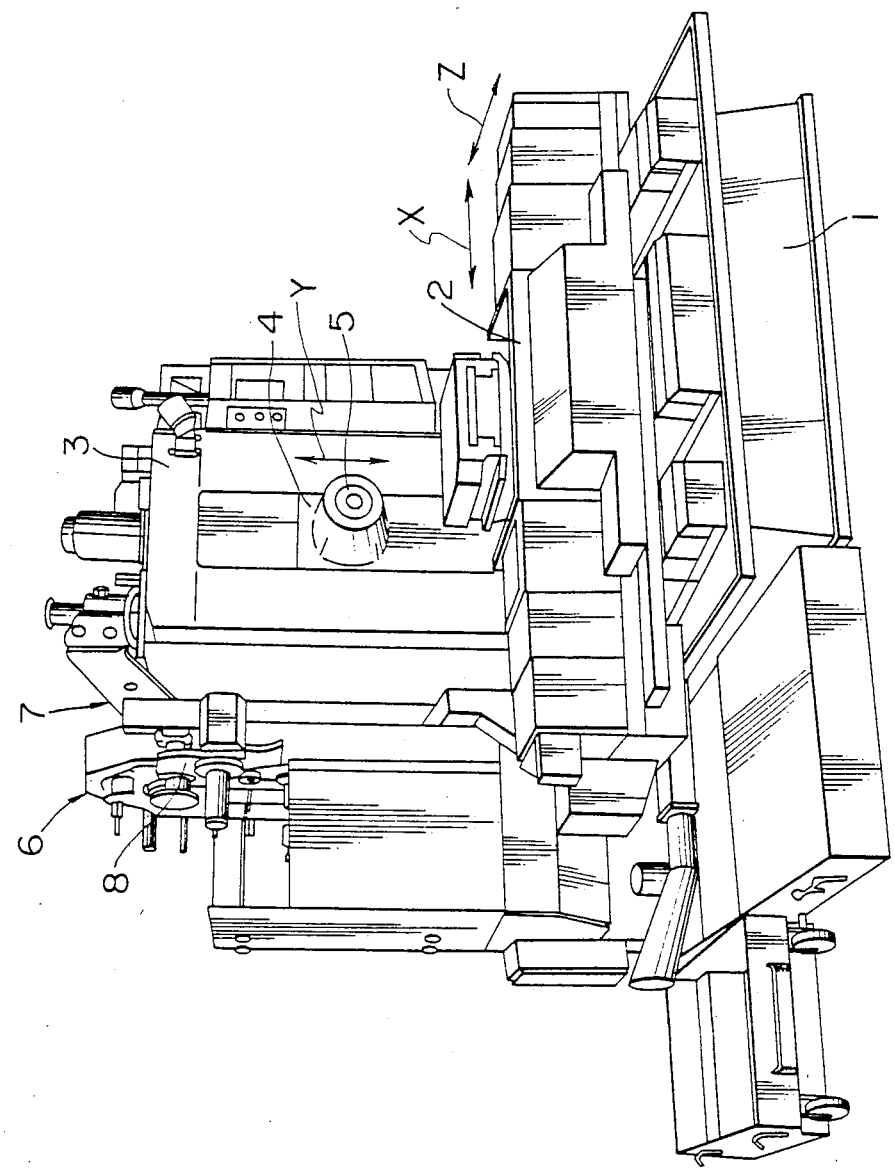
FIG. 2 is a perspective view of a machining center incorporating the tool mounting apparatus of the present invention therein.

In a conventional machining center as shown in FIG. 2, a table 2 is mounted on a bed 1 for movement in X and Z directions to be positioned in place. Further, a column 3 is uprightly mounted behind the bed 1, and a spindle head 4 is mounted on a sliding guide surface which is slidable in a Y direction and which is arranged in a central portion of the column 3, the spindle head being movable to be positioned in place. A spindle 5 is rotatably mounted on the spindle head 4 by means of a plurality of bearings (not shown) and extends in the horizontal Z direction. Further, a tool magazine 6 is provided for indexing a desired tool in a tool changing position. An ATC (Automatic Tool Changer) 7 having a tool arm 8 is arranged for automatically changing the tool carried by the tool magazine 6 and indexed in the tool changing position to a tool carried by the spindle 5.

The spindle 5 is provided at its free or forward end with a central tapered bore 5a for receiving a tool holder 18 with the tool, the tapered bore being communicated with a central bore formed in the spindle.

Figure 1:
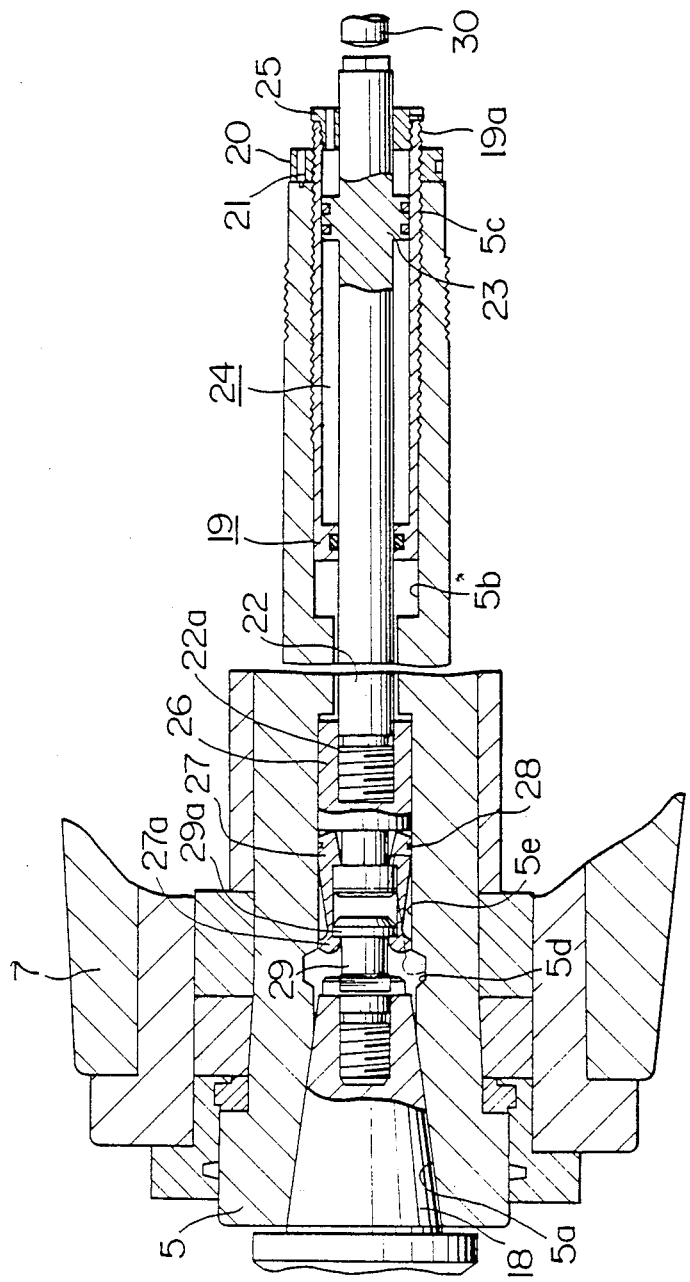
FIG. 1 is a longitudinal sectional view of a tool mounting apparatus according to an embodiment of the present invention.

According to the present invention, the central bore of the spindle includes an enlarged bore portion 5b positioned at a rear portion of the spindle and having a long threaded portion (female thread) 5c which extends from a rear distal end of the spindle toward the front end thereof. A cylinder 19 is adjustably inserted in the enlarged bore portion 5b of the spindle. The cylinder 19 is provided at its outer peripheral end portion with a threaded portion (male thread) 19a which is threadedly engaged by the threaded portion 5c of the enlarged bore 5b. Accordingly, by rotating the cylinder 19 in the enlarged bore 5b of the spindle 5 through the threaded portions 19a and 5c, the cylinder can be adjusted in an axial direction with respect to the spindle 5. However, the cylinder 19 is normally fixed to the spindle 5 by means of a lock nut 20 to prevent the cylinder from rotating with respect to the spindle. In order to assure that the lock nut 20 is not loosened due to a shock, impact and the like, an anti-rotation bolt 21 is threaded through the lock nut in parallel with an axis of the latter so that a free end of the bolt 21 is received into a corresponding hole formed in the end face of the spindle 5. A piston 23 is sealingly and slidably received in the cylinder 19. A piston rod extending from both sides of the piston 23 constitutes a pull rod 22. As shown in FIG. 1, the left end of the pull rod 22 is provided with a threaded connector 22a to which a pulling pin 26 is threadedly connected, whereas the right end of the pull rod 22 passes through a lid 25 threaded into the right end of the cylinder and faces, with a small clearance, to a piston rod 30 of a piston/cylinder unit (not shown) for urging the pull rod 22.

A high elastic fluid 24 is filled in a fluid-tight sealed chamber defined by the piston 23 and the cylinder 19. The high elastic fluid may be silicon liquid available in a market, which can be compressed by 9.4% with a pressure of 1400 kg/cm² when mechanically compressed. An elastic or resilient force obtained by compressing the high elastic fluid 24 can be adjusted to apply to the pull rod 22 an optimum pulling force with respect to all of the tools to be mounted. When the adjustment is to be made, the anti-rotation bolt 21 and the lock nut 20 are released, and then the cylinder 19 is rotated and shifted to the right (FIG. 1) through the relative movement between the threaded portions 19a and 5c along with the piston 23 and the pull rod 22, thereby compressing the high elastic fluid 24 between the stopped piston 23 and the moving cylinder 19.

The pulling pin 26 threadedly jointed to the pull rod 22 is received in a central bore 5e followed by the tapered bore 5a of the spindle 5 and is provided at its left end with a collet attachment 27 comprising a plurality of pivoted axial collet pawls 27a each of which is biased toward its opened position by a corresponding spring 28 seated in a recess formed in the rear or right end portion of the pawls. In the illustrated position, the collet pawls 27a have been shifted to a closed position by engaging with the inner surface of the bore 5e to grip a pull stud 29 of the tool holder 18, as shown in FIG. 1.

When the pull rod 22 and accordingly the pulling pin 26 is shifted to the left, the collet pawls 27a of the collet attachment 27 are introduced into an annular groove 5d formed between the bores 5a and 5e. Thus, the collet pawls are opened by an action of the spring 28. In this opened position, the tool holder 18 can be introduced into or removed from the collet attachment 27. When the tool holder 18 is introduced into the collet attachment 27, a head 29a of the pull stud 29 of the tool holder is received between the opened collet pawls 27a.

In operation, when the spindle head 4 is shifted to the Y direction to be positioned in an upper tool changing position. The tool arm or twin arm 8 of the ATC 7, one of the grippers of which grips the next tool, is turned by 90° toward the spindle and the other gripper grips the used tool holder 18 mounted in the tapered bore 5a of the spindle 5. Then, the piston rod 30 of the piston/cylinder unit is shifted to the left by actuating the unit, thus pushing or urging the pull rod 22 to the left. The urged pull rod 22 moves forwardly (to the left) to shift the collect pawls 27a through the pulling pin 26 to the left until the collet pawls 27a are introduced into the annular groove 5d, thereby opening the collet attachment 27 by the action of the springs 28. During the forward movement of the pull rod 22, the high elastic fluid 24 sealed in the cylinder 19 is further compressed by the piston 23 integral with the moving pull rod 22. Then, the twin arm 8 removes or detaches the used tool holder from the tapered bore 5a of the spindle 5, turns by 180° to bring the new next tool holder with the tool to a position aligned with the tapered bore 5a, and then introduces the new tool holder 18 into the tapered bore 5a of the spindle 5 to bring the head 29a of the pull stud 29 of the tool holder into the opened collet pawls 27a of the collet attachment 27. Thereafter, the piston rod 30 of the piston/cylinder unit is retracted by deenergizing the unit, thereby retracting or pulling the pull rod 22 by the resilient force of the compressed elastic fluid 24 acting on the piston 23, with the result that the collet pawls 27a of the collet attachment 27 are also pulled to the right to disengage from the annular groove 5d and are engaged by the inner surface of the central bore 5e, thus gripping the head 29a of the pull stud 29, thereby fixedly mounting the new tool holder with the tool on the spindle 5. In this case, since the fixing force for fixedly mounting the tool holder on the spindle is determined by an amount of compression of the high elastic fluid 24, such fixing force may be adjusted by adjusting the axial position of the cylinder 19.

In the illustrated embodiment, although the present invention was explained in connection with the spindle and tool (tool holder), it should be noted that the present invention is not limited to such spindle and tool. For example, the present invention can be constructed as an apparatus for detachably mounting a different removable element such as a grinding wheel (abrasive wheel) on a grinding wheel spindle or other removable fixing devices or the like.

As mentioned above, according to the present invention, since the high elastic fluid is filled in the cylinder adjustably arranged in the bore formed in rear portion of the spindle and a piston integrally formed with the pull rod is slidably mounted in the cylinder so that the mounting and pulling force for the tool holder with the tool may be obtained by the restoring resilient force of the high elastic fluid without the use of the coned disc springs or coil spring, there is no unbalance rotation of the spindle due to the eccentricity of such spring, whereby the spindle can be rotated at a high speed without vibration thereof, the service life of the apparatus can be extended because there is no mechanical fatigue of the spring and the like, and the mounting and fixing force for the tool holder can be easily adjusted.

What is claimed is:

1. A mounting apparatus for fixedly mounting a removable element such as a tool or an abrasive wheel to a rotatable spindle comprising a resilient means incorporated into said spindle, said resilient means being constituted to create a resilient force by compressing a sealingly enclosed elastic fluid, said resilient force of said resilient means fixedly mounting the removable element to the rotatable spindle.

2. A mounting apparatus as set forth in claim 1, wherein said high elastic fluid is sealingly accommodated between a cylinder and a piston sealingly mounted in the cylinder and integrally formed with a pull rod, and said resilient force may be adjusted by adjusting an axial position of said cylinder in said spindle.

3. A mounting apparatus as set forth in claim 1, wherein said elastic fluid may be compresses by as much as 9.4 percent with a pressure of 1400 kg/cm$^2$.

4. A mounting apparatus as set forth in claim 2, wherein said elastic fluid may be compressed by as much as 9.4 percent with a pressure of 1400 kg/cm$^2$.

* * * * *